Dec. 7, 1937. G. J. WOREL 2,101,279
PISTON EXPANDER
Filed June 3, 1935
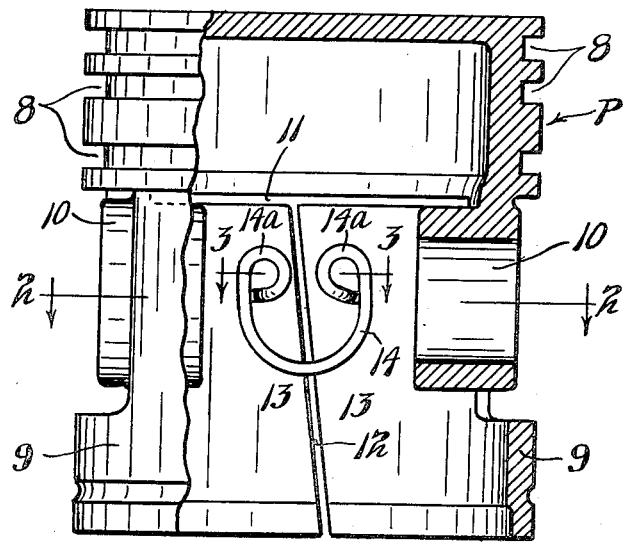
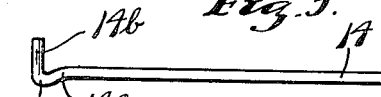
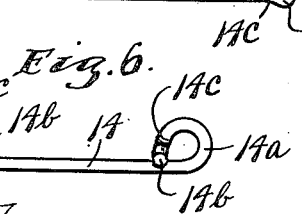
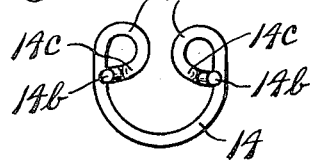
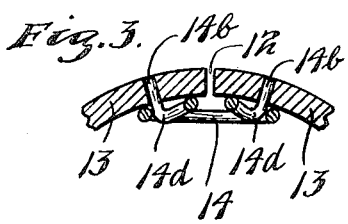
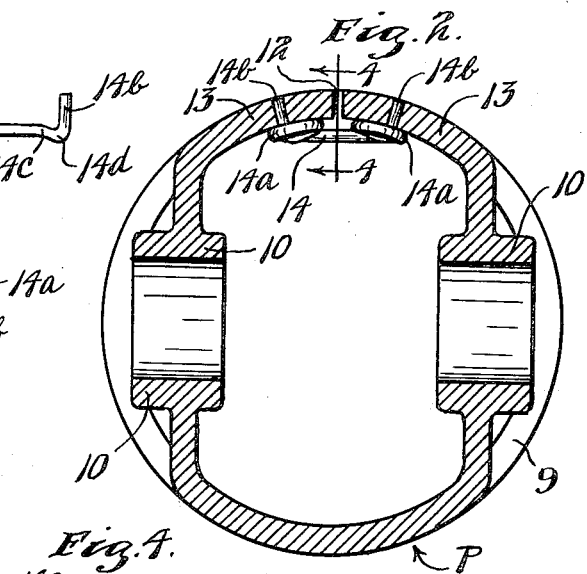
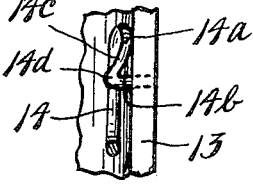
INVENTOR.
GLEN J. WOREL.
BY HIS ATTORNEYS.
Williamson & Williamson Patented Dec. 7, 1937

2,101,279

UNITED STATES PATENT OFFICE

2,101,279

PISTON EXPANDER

Glen J. Worel, Minneapolis, Minn., assignor to Charles M. O'Neil, Hopkins, Minn.

Application June 3, 1935, Serial No. 24,594

6 Claims. (Cl. 309—12)

This invention relates to compact, resilient expanders for pistons of internal combustion engines and is an improvement on the piston skirt expander disclosed in the C. M. O'Neil Patent No. 1,850,214 granted on March 22nd, 1932.

In said O'Neil patent a simple and successful device was disclosed for resiliently expanding the split skirt of a piston to prolong its usefulness and to eliminate the objectionable piston "slapping" at a minimum expense and effort.

It is an object of my invention to provide a piston skirt expander of the general construction of said O'Neil device, but having several important improvements in the construction of the surfaces of the expander which bear against the inner wall of the piston when the device is installed and in the construction of the projecting attachment lugs, which improvements give greater efficiency and accuracy to the expansion of the piston and which enable the expanders to work efficiently for a longer period of time than in the original construction without danger of injury to cylinder walls.

More specifically it is an object of my invention to provide improvements on the original O'Neil expander which are responsible for a more perfect abutment or bearing relation between the body of the device and the inner wall of the piston on which it is applied and which relieves the attachment lugs and their connection with the body of the expander from wear and friction which in some instances in the original O'Neil structure has in time caused projection of the attachment lugs slightly beyond the outer periphery of the piston.

It is a further object to provide a simple and economical method for making the improved piston expander heretofore referred to.

These and other objects and advantages of the invention will be more fully set forth in the following description made in connection with the accompanying drawing, in which like reference characters refer to similar parts throughout the several views, and in which:—

Fig. 1 is a view partly in vertical section and partly in side elevation of a conventional slotted type piston having one of my improved expanders operatively applied thereto;

Fig. 2 is a cross sectional view taken on the line 2—2 of Fig. 1;

Fig. 3 is a fragmentary cross sectional view taken substantially on the line 3—3 of Fig. 1 and showing the bearing or abutment relation of the body and end loops of the expander with the inner wall of the expander;

Fig. 4 is a fragmentary vertical sectional view taken substantially on the line 4—4 of Fig. 2, looking in the direction of the arrows;

Fig. 5 is a view illustrating the first and second steps which may be simultaneously carried out in the method of making my improved expander;

Fig. 6 is a view illustrating the third step of my method, and

Fig. 7 illustrates the final step and the completed device.

In the drawing one of my expanders is shown operatively associated with a piston "P" of the conventional type widely used at this time. Said piston comprises a solid head portion having the annular grooves 8 for reception of the piston rings and having a skirt 9 depending from the head provided with a pair of wrist pin bosses or bearings 10 oppositely disposed and as shown integrally formed with the skirt. The skirt 9 is in part separated from the head by a cross slot 11 and is split as by a longitudinal slot 12 inclined as shown slightly from the vertical and which joins or intersects slot 11 thus forming a pair of somewhat flexible wings 13 included in the skirt structure. The slotted construction of the piston skirt with the T-slot formed by slots 11 and 12 enables the skirt to yieldably contact with the cylinder wall of the engine. It is a fact, however, that unless the piston is perfectly fitted or if a properly fitted piston has become worn through extensive use the diameter of the skirt is reduced slightly causing slight tilting of the piston in its reciprocating movement and producing what is commonly known as "piston slap". Furthermore, the slapping of the piston quickly wears the edges of the piston rings and its tilting movement with the worn rings produces leakage or oil pumping, which is objectionable and lessens the efficiency of the engine. The general purpose of my improved piston expander is, of course, to slightly spread the slotted portions of the piston skirt to compensate and take up for wear thereby eliminating piston slapping and to prevent wear of the edges of the piston rings and consequently leakage or pumping of oil.

My improved expander is in the general form of a horseshoe or substantially U-shaped spring member 14 which can be made from heavy spring wire and the U-shaped body of which lies substantially in a plane. The upper portions of the legs of the U of the spring element are bent circularly and inwardly to form loops 14a which define planes angled slightly with reference to each other to snugly engage against the inner concave wall of the piston skirt at opposite sides of the slot 12. The extremities of the legs of the spring member 14 are bent to form a pair of diverging attachment lugs 14b which extend substantially normal to the planes of their respective loops 14a from which they extend.

An important point in the construction of the loops and attachment lugs is the retraction or bending of the portions of the loops connecting the loops proper with the attachment lugs 14b. By referring to Figs. 2, 3 and 4 it will be noted that the spring wire or other flexible spring element at points immediately adjacent the lugs 14b is bent inwardly of the plane defined by the outer faces or surfaces of the loops at points 14c and the actual bends 14d of the attachment lugs are curved arcuately and the smaller curves of bends 14c are disposed inwardly of the planes defined by said outer surfaces of the lops. In other words, the adjacent bent portions 14c and 14d at the ends of the spring member form reverse curves which retract the shoulders or portions of the loops from which lugs 14b project away from the planes defined by the outer surfaces of loops 14a preventing any wear on the bends 14c when the device is installed and in usage.

In installing my expander in a piston a pair of holes are drilled on opposite sides of slot 12 and aligned circumferentially of the piston skirt and being spaced apart less distance than the normal distance between attachment lugs 14b. The lug receiving holes are drilled more or less radially of the periphery of the piston skirt to receive and retain the diverging lugs 14b.

In inserting the expander the ends must be sprung together somewhat, which can be readily accomplished by utilizing a suitable plier for engaging the attachment lugs and pulling them together. The diverging lugs, either before or after insertion, are filed or cut at their outer ends so that such extremities will not project beyond the outer periphery of the skirt.

It will be obvious that the expander may be applied at various heights with regard to the skirt 9 whereby considerable adjustment may be obtained in the manner in which the slotted portion of the skirt is spread. When applied to a certain portion of the skirt the slot 12 will be expanded uniformly from top to bottom. In some instances it is desirable to expand the skirt more or less at the lower end than at the upper end, which may be accomplished in accordance with the requirements by locating the expander at the proper height with reference to the skirt. In some instances it is desirable to use a plurality of said expanders.

The expansive force exerted by my expander may be varied within fairly wide limits by varying the distance apart of the two holes drilled on opposite sides of slot 12.

The diverging lugs of the O'Neil expander after long continued use would sometimes project slightly beyond the periphery of the piston skirt due to the fact that the bends for the diverging lugs actually abutted or engaged against the drilled holes of the slotted skirt wherein such lugs were received. If the lugs were bent arcuately for strengthening purposes the wear on the arcuate curves after long continued use would sometimes be sufficient to enable the lugs to work outwardly somewhat in the drilled holes projecting their extremities as has been stated, a slight distance beyond the piston and in time occasionally scoring the cylinder walls. If the said O'Neil lugs were bent at substantially right angles by crimping or otherwise variously bending the spring material, this weakened the connection of the lugs with the body of the expander and sometimes upon insertion of the expander in the piston when considerable compressive force was used to draw the upper ends of the expander together, the lugs would break off.

My improved structure overcomes the objectionable features of the O'Neil expander and provides an improved and more accurate bearing surface for the expander. In my expander the base of the U engages against the wall of the piston and the substantially plane surfaces at the outer faces of the loops from the shoulders or adjacent bearing surfaces for precisely positioning the expander with reference to the slotted skirt of the piston and for preventing projection of the lugs in the receiving sockets due to long continuous wear.

My efficient and simple method for making the expander previously described consists, generally stated, in the following steps:— A length of suitable rod, strip or wire material capable of being tempered and drawn to the desired resiliency is first cut into preferably a straight length of proper dimension; next the element cut to length is bent slightly at points adjacent both its ends, said bends extending from the center line of the main portion of the element as clearly shown in Fig. 5. The ends of the wire or member are then up-turned nearly at right angles to the center line of the body and bent arcuately at 14d as also shown in Fig. 5. Both of said steps may be carried out simultaneously with suitable dies.

The portions of the wire adjacent bends 14c are then circularly bent in planes extending substantially normal to the attachment lugs 14b as shown in Fig. 6 with the planes defined by the outer surfaces of the loops formed being disposed outwardly of the bends 14c. The intermediate portion of the element is then bent in the shape of a U as shown in Fig. 7 and the device is thereafter treated to produce and attain the proper degree of resiliency and the proper expansive force.

What is claimed is:—

1. In combination with a piston having a skirt provided with a slot to permit expansion, an expander comprising a curved spring member, the body of which lies substantially in a plane, extending vertically against the inner peripheral wall of said piston skirt and traversing said slot, said spring member having a pair of attachment lugs at its ends for engagement with said piston skirt at opposite sides of the slot and said spring member having bearing portions adjacent said attachment lugs for engaging the inner piston wall, the outer surface of said bearing portions being disposed outwardly of the inner and connected ends of said attachment lugs.

2. In combination with a piston having a skirt provided with a slot to permit expansion, an expander comprising a curved spring member, the body of which lies substantially in a plane, extending vertically against the inner peripheral wall of said piston skirt and traversing said slot, said spring member having a pair of curved bearing portions, one adjacent each end thereof, and a pair of attachment lugs for engagement with the piston skirt at opposite sides of said slot, said lugs extending at angles to the plane of said body and being connected with said bearing portions, said bearing portions engaging the inner wall of said piston skirt and the points of connection between said lugs and said bearing portions being disposed inwardly of the outer surfaces defined by said bearing portions.

3. In combination with a piston having a skirt provided with a slot to permit expansion, an expander comprising a curved spring member, the body of which lies substantially in a plane extending vertically against the inner peripheral wall of said piston skirt and traversing said slot, said spring member having a pair of loop-shaped bearing portions, one adjacent each end thereof, said loops defining at their outer surfaces a pair of planes angled slightly with respect to each other to snugly conform to the concave inner wall of said piston, and a pair of diverging attachment lugs for engagement with the piston skirt at opposite sides of said slot, said lugs extending angularly to the plane of said body and being connected with said bearing portion, the points of connection between said lugs and said bearing portions being disposed inwardly of the outer surfaces defined by said bearing portions.

4. In combination with a piston having a skirt provided with a slot to permit expansion, an expander comprising a curved spring member, the main portion or body of which lies substantially in a plane, said body lying snugly against the inner peripheral wall of the piston skirt and traversing said slot, said spring member having bent extremities extending outwardly from said plane and constituting a pair of connecting lugs for positive engagement with the piston skirt at opposite sides of said slot, said body including loop portions one adjacent each end thereof from which said lugs extend, said extremities or lugs extending in an arcuate curve at their bent portions and the portions immediately inward of said bent portions at each end being off-set slightly from the general plane of said body and from said loop portions whereby said loop portions and body will constitute the abutment surfaces of the device against the inner wall of the piston leaving the inner arc of said bent portions spaced slightly inwardly of the apertured portions of said piston skirt.

5. In combination with a piston having a skirt provided with a slot to permit expansion, an expander comprising a curved spring member having a main portion or body which lies substantially in a plane, said body lying snugly against the inner peripheral wall of the piston skirt and traversing said slot, said spring member having turned extremities extending outwardly from said plane and constituting a pair of spreading lugs adapted for positive engagement with the piston skirt at opposite sides of said slot to exert a spreading action, said spring member including loop portions, one adjacent each of said spreading lugs, said loop portions constituting abutment surfaces engaging against the inner wall of the piston above a line connecting said spreading lugs while said body engages said piston wall below such line, said spreading lugs being connected with said loop portions.

6. In combination with a piston having a skirt provided with a slot to permit expansion, an expander comprising a curved spring member, the body of which lies substantially in a plane, extending vertically against the inner peripheral wall of said piston skirt and traversing said slot, said body having a pair of curved bearing portions one adjacent each end of said spring member, the extremities of said spring member being bent on arcuate lines from said bearing portions to form a pair of connecting lugs for engagement with the piston skirt at opposite sides of said slot, said lugs extending at angles to the plane of said body and said arcuate bent portions being offset inwardly from said bearing portions and the general plane of said body whereby when said expander is operatively applied to the inner periphery of said piston the inner arcs of said bent portions are spaced inwardly from said periphery.

GLEN J. WOREL.